United States Patent [19]

Yost

[11] Patent Number: 5,566,573
[45] Date of Patent: Oct. 22, 1996

[54] CAPACITIVE ACOUSTIC WAVE DETECTOR AND METHOD OF USING SAME

[75] Inventor: William T. Yost, Newport News, Va.

[73] Assignee: The United States of America as represented by the United States National Aeronautics and Space Administration, Washington, D.C.

[21] Appl. No.: 317,491

[22] Filed: Sep. 27, 1994

[51] Int. Cl.$^6$ ................................................ G01N 29/12
[52] U.S. Cl. ............................ 73/643; 73/644; 73/654; 73/579; 324/662
[58] Field of Search .......................... 73/643, 579, 644, 73/632, 602, 659, 654, 599, 574, 575; 324/662

[56] References Cited

U.S. PATENT DOCUMENTS

| | | | |
|---|---|---|---|
| 2,677,270 | 5/1954 | Sanderson | 73/659 |
| 3,577,774 | 5/1971 | Steffens et al. | 73/643 |
| 3,930,405 | 1/1976 | Renken, Jr. | 73/658 |
| 4,246,793 | 1/1981 | Fairand et al. | 73/628 |
| 4,418,573 | 12/1983 | Madigosky et al. | 73/574 |
| 4,451,780 | 5/1984 | Ogasawara | 324/662 |
| 4,649,750 | 3/1987 | Cantrell, Jr. et al. | 73/599 |
| 5,345,825 | 9/1994 | Lee et al. | 73/574 |

*Primary Examiner*—Hezron E. Williams
*Assistant Examiner*—Rose M. Finley
*Attorney, Agent, or Firm*—Kimberly A. Chasteen

[57] ABSTRACT

A capacitor having two substantially parallel conductive faces is acoustically coupled to a conductive sample end such that the sample face is one end of the capacitor. A non-contacting dielectric may serve as a spacer between the two conductive plates. The formed capacitor is connected to an LC oscillator circuit such as a Hartley oscillator circuit producing an output frequency which is a function of the capacitor spacing. This capacitance oscillates as the sample end coating is oscillated by an acoustic wave generated in the sample by a transmitting transducer. The electrical output can serve as an absolute indicator of acoustic wave displacement.

16 Claims, 3 Drawing Sheets

CAPACITIVE ACOUSTIC WAVE DETECTOR AND METHOD OF USING SAME

ORIGIN OF THE INVENTION

The invention described herein was made by an employee of the United States Government and may be used by or for the Government for governmental purposes without the payment of any royalties thereon or therefor.

BACKGROUND OF THE INVENTION

1. Technical Field of the Invention

The present invention relates generally to the detection of ultrasonic waves and more particularly to a capacitive detection apparatus and method for detecting acoustic waves in a sample.

2. Discussion of the Related Art

The detection of ultrasonic waves is important in a wide variety of applications including materials characterization and medical analysis. Current transducers fall into two broad categories of piezoelectric elements or magnetic concepts. Well-damped piezoelectric transducer elements are normally designed to operate from 100–250 KHz up to 250 MHz, Specifically shaped piezoelectric elements designed for point contact use low frequency responses from 50 KHz to approximately 2 MHz. Both types of transducers are not true specimen displacement sensors since the voltage generated is a result of compression of the transducer by the ultrasonic waves. In addition, these transducers acoustically interact with the ultrasonic wave, thereby altering the detected wave.

The magnetic units employ eddy currents and magnetic fields to detect both bulk waves and surface waves. A strong, homogeneous magnetic field is required to measure absolute amplitudes. Both sufficient strength and homogeneity are difficult to maintain.

OBJECTS

It is accordingly an object of the present invention to detect ultrasonic waves in a sample.

It is another object of the present invention to perform absolute displacement measurements to detect acoustic waves.

It is a further object of the present invention to detect ultrasonic waves while avoiding acoustic interaction with the waves.

It is another object of the present invention to obviate the need for strong homogenous magnetic fields in ultrasonic wave detection.

Additional objects and advantages of the present invention are apparent from the drawings and specification which follow.

SUMMARY

The foregoing and additional objects are obtained by a capacitive detector according to the present invention. A dielectric having two substantially parallel faces is placed between a coated sample end (conductor) and an electrode such that a capacitor is formed comprising the sample end coating, the dielectric and the electrode. The formed capacitor is connected to an LC oscillator circuit such as a Hartley oscillator circuit producing an output frequency which is a function of the changing capacitance of the capacitor. This capacitance oscillates as the sample end coating is oscillated by an acoustic wave generated in the sample by a transmitting transducer.

DETAILED DESCRIPTION

Figure 1:
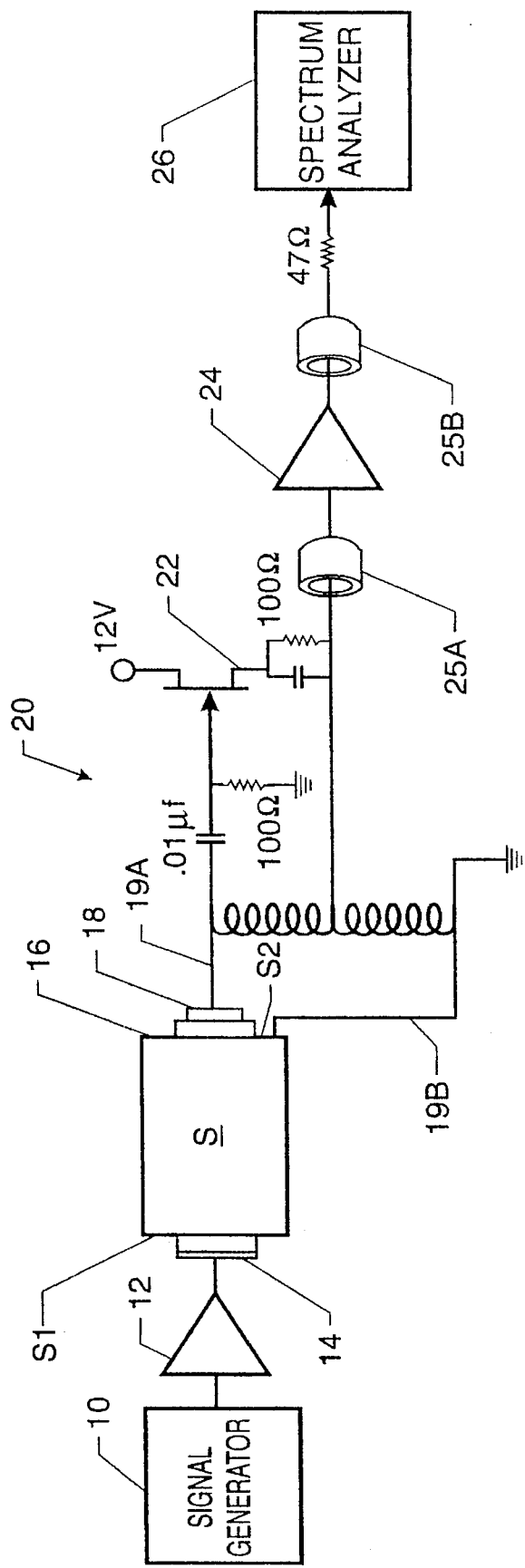
FIG. 1 is a schematic of the present invention coupled to a conventional Hartley oscillator circuit to detect and analyze transmitted waves.

Referring to FIG. 1, the present invention is schematically represented with reference to a sample S such as ULE 7971 glass commercially available from Corning Glass Works. The sample has a first end S1 and a coated 2nd end S2. The second end S2 may be coated with a metallic such as gold, copper, silver, or chrome. A signal generator 10 such as an HP 3325 frequency synthesizer commercially available from Hewlett-Packard generates a desired frequency signal which is amplified by a broadband amplifier (bandwidth of greater than 30 MHz) 12 such as commercially available from ENI (ENI A 150). The amplified signal drives a transmitting transducer 14 such as a 5 MHz lithium niobate compressional transducer. Transducer 14 is acoustically coupled to a first end S1 of sample S via transmission gels or otherwise as known in the art. The transducer sets up an ultrasonic wave in the sample S which propagates to the opposite second end.

A dielectric layer 16 is provided having first and second substantially parallel opposite faces. The dielectric may have any suitable composition such as mica or Teflon. The purpose of the dielectric is to enhance the capacitance of the parallel conductive plates and to serve as a spacer. Because there is no acoustic couplant between the dielectric and the coated sample end S2, the dielectric and sample end are acoustically isolated from each other and the sample end S2 behaves as a "free" boundary whose characteristics are well known to acousticians. An electrode 18 is located at the second dielectric face. Electrode 18 may be any conducting material such as copper. As the coating of the sample second end S2 oscillates in response to the acoustic wave at the free boundary, the capacitance between this coating and the electrode 18 also oscillates as described in greater detail below. This oscillating capacitance is the resonating capacitance in a Hartley or other LC oscillator circuit 20 which is maintained in oscillation by an active current element 22. This schematic is by way of illustration and in no way limits the present invention, which can be used to frequency modulate any LC (inductance-capacitance) oscillator circuit. The depicted circuit 20 is the classic Hartley LC oscillator which is driven by active circuit element 22 in the form of a J-FET (junction field-effect transistor). The Hartley oscillator and J-FET are well known in the art and described in detail in various textbooks in electronics such as Horowitz & Hill "The Art of Electronics". The capacitor formed by the sample end coating, dielectric 16 and electrode 18 is referred to as FMESAT (Frequency Modulation Electrostatic Acoustic Transducer) and serves to frequency modulate the output of the LC circuit.

The output frequency signal of the oscillating circuit 20 passes through a buffer amplifier 24 such as LH-0002 IC (integrated circuit) commercially available from National Semiconductor is used to buffer the output of the LC oscillator circuit 20 and to a spectrum analyzer 26 such as model HP 3585 AC commercially available from Hewlett-Packard which determines the amplitude of the ultrasonic wave detected by the dielectric-electrode arrangement based on the frequency of the LC circuit. Ferrite beads 25A and 25B are provided on the input and output sides of buffer amplifier 24 to suppress spurious oscillations in the LH 0002.

This dielectric-electrode configuration is referred to as an F.M. capacitive detector. It is an ultrasonic transducer which permits absolute displacement measurements as described below. The configuration of electrodes permit detection of bulk waves impinging on the surface since the capacitance variation causes the electrical modulation. This configuration is set up to detect bulk compression waves reflected at the unbound (free) end of the sample. The detection of bulk compressional waves is described in detail. The capacitive detector can be designed to operate over a wide range of frequencies from approximately DC to a fraction of the resonant frequency of approximately 10 MHz of the Hartley oscillator ("front end" network) comprising the capacitive detector and the inductor.

Figure 2:
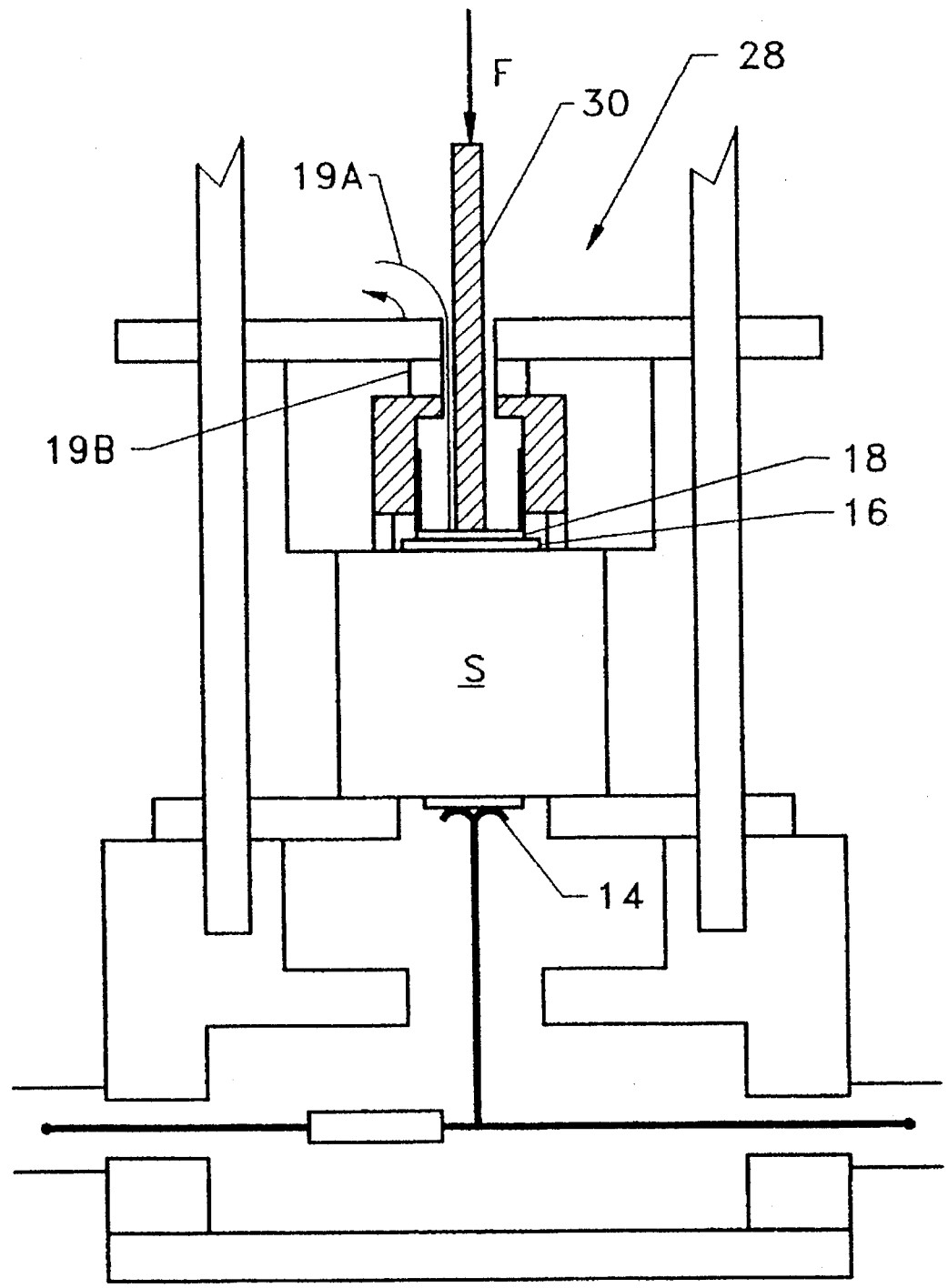
FIG. 2 is a side view of a sample holding apparatus used in conjunction with the present invention.

FIG. 2 shows one arrangement of the present invention. A sample holding apparatus 28 is provided for sample S. An actuator 30 maintains a constant downward mechanical force on electrode 18 to hold it firmly against the dielectric 16 and coated sample end S2 to form the capacitor. The electrode 18 is held in proximity with the coated sample end S2 by the dielectric 16 serving as a spacer. As shown, connecting wire 19A connects the electrode 18 to the circuit and wire 19B connects the circuit to the coated sample second end S2.

Figure 3:
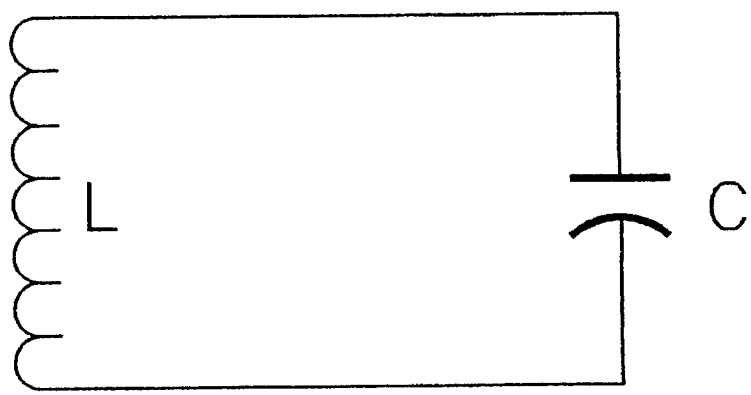
FIG. 3 is a schematic of a standard LC circuit.

FIG. 3 shows a basic LC circuit wherein L refers to the inductance of the coils, C refers to the capacitance of the capacitor, and the natural angular frequency $\omega_o$ for a resistance-less LC circuit is given by $$\omega_o = \frac{1}{\sqrt{LC}} \tag{1}$$

If the distance between the capacitor plates, i.e., between the sample end coating and electrode 18, changes then $$C = C_o \left( 1 + \frac{\Delta C}{C_o} \right) \tag{2}$$

wherein $C_o$ is the quiescent capacitance. The inductance L of the circuit of course remains constant in the present embodiment. For a parallel plate capacitor as in the present invention, the following relationship exists $$C = \frac{C_o S}{l_o} \tag{3}$$

wherein S is the distance between the plates at capacitance C, and $l_o$ is the initial distance between the plates at capacitance $C_o$. We have from Eq. (2) and (3)

$$\frac{\Delta C}{C_o} \cong -\frac{\Delta l}{l_o}, \tag{4}$$

wherein $\Delta l$ is the change in distance between the plates. Combining Eqs. (4) and (2) into (1) and expanding, $$\omega = \omega_o \left( 1 + 1/2 \frac{\Delta l}{l_o} \right), \tag{5}$$

wherein $\omega$ is the angular frequency of the LC circuit.

The distance between the plates varies because of an ultrasonic wave impinging on the end of the sample according to $$\Delta l = 2A \cos \omega_s t, \tag{6}$$

wherein A is the amplitude of the acoustic wave, $\omega_s$ is the angular frequency of the sound wave, and t is time. Combining Eqs. (5) and (6) yields $$\omega_{(t)} = \omega_o \left( 1 + \frac{A}{l_o} \cos \omega_s t \right) \tag{7}$$

The output v(t) of the LC circuit can be expressed as $$v(t) = V_o \sin (\omega_o t + \psi) \tag{8}$$

wherein $V_o$ is the quiescent voltage amplitude of the oscillator, i.e., the oscillator output voltage amplitude when the sound field is turned off ($\Delta l=0$), and $\psi$ is the phase angle. Given that $$\omega(t) = \frac{d}{dt}(\omega_o t + \Psi) = \omega_o + \frac{d\Psi}{dt} = \omega_o + \frac{\omega_o A}{l_o} \cos \omega_s t, \tag{9}$$

results in $$\frac{d\Psi}{dt} = \frac{\omega_o A}{l_o} \cos \omega_s t. \tag{10}$$

Integrating Eq. (10) results in $$\Psi(t) = \frac{\omega_o A}{\omega_s l_o} \sin \omega_s t + \theta_o. \tag{11}$$

Setting $\theta_o=0$ and substituting Eq. (11) into Eq. (8), $$V(t) = V_o \sin (\omega_o t + \delta \sin \omega_s t) \tag{12}$$

wherein $\delta$ is the deviation ratio expressed as $$\delta = \frac{\omega_o A}{\omega_s l_o}. \tag{13}$$

Expanding in terms of single frequency components, $$V(t) = V_o \sum_{n=-\infty}^{\infty} J_n(\delta) \sin(\omega_o + n\omega_s)t \tag{14}$$

This provides a set of frequencies and associated amplitudes which are proportional to the Bessel functions, i.e., $$\{\omega_o + n\omega_s\} \sim \{V_o J_n(\delta)\} \tag{15}$$

represents this set of frequencies and associated amplitudes. Letting $v_n = V_o J_n(\delta)$, where $v_n$ is the voltage of the nth sideband, then $$J_n(\delta) = V_n/V_o. \tag{16}$$

Eq. (16) is solved over a specific range. Substituting Eq. (16) into Eq. (13) yields $$A = \delta(\omega_s/\omega_o) l_o \tag{17}$$

If $\omega_s \approx \omega_0$ and using the first sideband, $$A = \frac{2V_1}{V_o} \left( \frac{\omega_s}{\omega_o} \right) l_o. \tag{18}$$

If $\omega_s \ll \omega_o$, the system becomes quite sensitive. Using any one or all of the sidebands, $\delta$ is determined experimentally. Then $$A = \delta \left( \frac{\omega_s}{\omega_o} \right) l_o. \tag{19}$$

As compared with the static bias voltage case where $$A = \frac{V_o}{V_{bias}} \frac{l_o}{2}. \tag{20}$$

Figure 4:
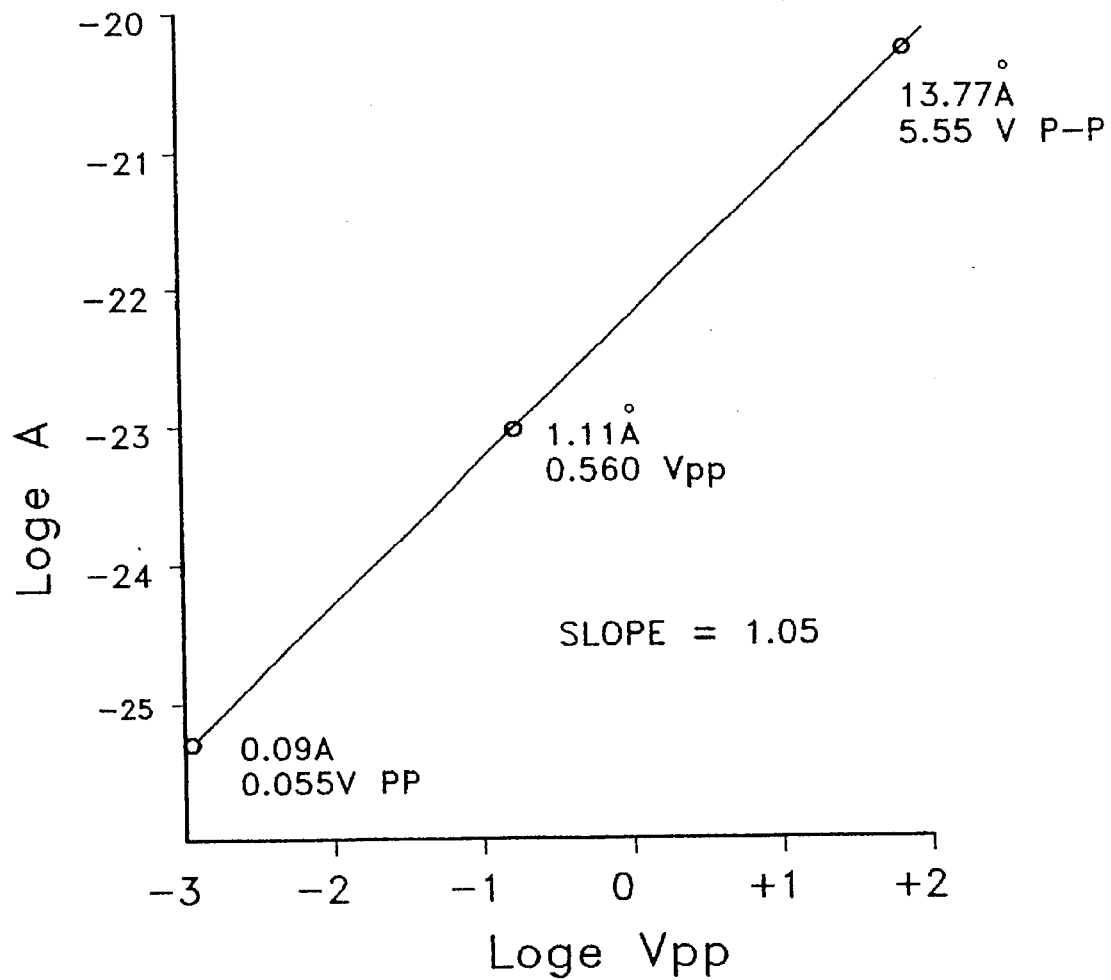
FIG. 4 is a log-log plot of sound wave amplitude versus drive voltage of the transmitting transducer.

FIG. 4 plots the calculated amplitude at low drive frequencies. Given the described instrumentation, the present invention can measure amplitudes of $9\times10^{-5}$ Angstroms at approximately 109 KHz. Specifically, a log-log plot of amplitude (meters) of the sound waves versus drive voltage $V_{pp}$ (volts) of a 5 MHz lithium niobate transducer at a drive frequency of 109.560 KHz is depicted for the cylindrical glass sample Corning ULE 7971 described above having a diameter of 1.5" and a length of 2". A slope of 1.05 was derived, showing experimentally that by using this technique, the displacement amplitude is linearly dependent on drive voltage, as predicted by theory.

Table 1 shows the calculated amplitude for a 5 MHz lithium niobate transducer at a low drive frequency of 109.56 KHz and a drive voltage of 55.5 VPP.

TABLE 1

| Bessel Function | | Deviation Ratio | | Wave Amplitude (Angstrom) | |
|---|---|---|---|---|---|
| $J_0$ | | 1.635 | | 474 | |
| $J_1$ | $J_{-1}$ | 1.524 | 1.587 | 442 | 460 |
| $J_2$ | $J_{-2}$ | 1.617 | 1.617 | 469 | 469 |
| $J_3$ | $J_{-3}$ | 1.612 | 1.620 | 467 | 470 |
| $J_4$ | $J_{-4}$ | 1.611 | 1.636 | 467 | 474 |

Amplitude average - $465 \pm 9.8$ Å

The plot (FIG. 4) indicates a linear relationship between the drive voltage to transducer and the sideband voltage. There is a close agreement of absolute amplitudes calculated from various sidebands, with a standard deviation within 2.5%. The use of a dielectric enhances the sensitivity of a non-destructive evaluation technique. Surface preparation, e.g., smoothing to reduce irregularities which interfere with wave parameters under consideration, is less critical. Since the measurements are taken on an acoustically vibrating "free surface", where the surface displacement amplitude (that which is measured) is precisely equal to twice the displacement amplitude of the acoustic wave within the solid, such a surface can be precisely modeled. The present invention also allows absolute amplitude calibration of the capacitive detector since all of quantities on the right side of equation (190 are known or can be measured. In addition, the invention results in enhanced sensitivity at low frequency ultrasonic waves (e.g., frequencies much smaller than the quiescent oscillator frequencies).

Using coil probes, the capacitance can be held fixed and the induction fluctuation in the coil measured as a surface acoustic wave passes through the material close to the location of the probe.

Many improvements, modifications, and additions will be apparent to the skilled artisan without departing from the spirit and scope of the present invention as described herein and defined in the following claims.

I claim:

1. A capacitive detector for detecting acoustic waves propagated through a non-gaseous material, comprising:
   a dielectric having first and second substantially parallel faces, the first face being acoustically isolated from a surface of the material; and
   an electrode electrically coupled to the second face of said dielectric;
   said electrode and material surface being adapted to connect to an inductance capacitance circuit for measuring an oscillating capacitance between said electrode and the material surface as the material surface is oscillated by each acoustic wave propagated through the material, the changing capacitance being indicative of acoustic waves propagated through the material.

2. The capacitive detector according to claim 1, wherein said dielectric is mica.

3. The capacitive detector according to claim 1, wherein said dielectric is Teflon.

4. A system for detecting acoustic waves propagated through a material, comprising:
   a dielectric having first and second substantially parallel faces, the first face adapted to be acoustically isolated from a surface of the material;
   an electrode electrically coupled to the second face of said dielectric; and
   an inductance-capacitance circuit outputting a frequency based on an oscillating capacitance between said electrode and the material surface as the material surface is oscillated by the acoustic waves propagated through the material, the output frequency being indicative of the propagated acoustic waves.

5. The detection system according to claim 4, wherein said inductance-capacitance circuit is an Hartley oscillator circuit.

6. The detection system according to claim 4, wherein said inductance-capacitance circuit is an L-C oscillator circuit.

7. The detection system according to claim 4, further comprising a metallic coating applied between the material surface and said electrode.

8. The detection system according to claim 4, wherein said dielectric is mica.

9. The detection system according to claim 4, wherein said dielectric is Teflon.

10. The detection system according to claim 4, further comprising means for contacting said dielectric to the material surface and means for contacting said electrode to said dielectric.

11. The detection system according to claim 4, further comprising means for analyzing the output frequency of said inductance-capacitance circuit.

12. The detection system according to claim 11, wherein said analyzing means correlates the output frequency of said inductance-capacitance circuit with the amplitude of the propagated sound wave.

13. A method of detecting acoustic waves propagating in a material, comprising the steps of:
   applying a dielectric having first and second substantially parallel faces to a material surface such that the first face of the dielectric is acoustically isolated from the material surface;
   applying an electrode in contact with the second dielectric face;
   measuring a change in capacitance between the electrode and the material surface as the material surface oscillates due to the propagated acoustic waves, the measured capacitance change being indicative of the propagated acoustic waves.

14. The method according to claim 13, further comprising applying a non-conductive metallic coating between the material surface and the electrode.

15. The method according to claim 13, wherein said measuring step comprises generating a frequency as a function of the change in capacitance between the electrode and the material surface.

16. The method according to claim 15, further comprising correlating the generated frequency with the amplitude of the propagated wave.

* * * * *